3,101,360
PROCESS FOR PRODUCING BIS(AROMATIC HYDROCARBON)IRON COMPOUNDS
Leo Parts, Buffalo, N.Y., and Roy L. Pruett, Charleston, and William R. Myers, Dunbar, W. Va., assignors to Union Carbide Corporation, a corporation of New York
No Drawing. Filed Oct. 29, 1958, Ser. No. 770,306
12 Claims. (Cl. 260—439)

This invention relates to a process for producing organo-iron compounds. More particularly, the invention relates to the preparation of bis(aromatic hydrocarbon) iron cations by the reaction of an aromatic hydrocarbon with an iron tetracarbonyl dihalide in the presence of an aluminum halide.

A method for preparing bis(aromatic hydrocarbon) iron cations has been described by Fischer and Bottcher, Ber. 89, 2397 (1956). This method involves the reaction of ferrous bromide with an aromatic hydrocarbon in the presence of aluminum bromide. However, this process gives a yield of only 30% based on iron in the starting materials.

We have now discovered that bis(aromatic hydrocarbon) iron cations may be produced in substantially quantitative yields by the reaction of an iron tetracarbonyl dihalide with an aromatic hydrocarbon compound and an aluminum halide. The exceptional yields attained by this process may be attributed to the solubility of the iron tetracarbonyl dihalide reactant in aromatic solvents in the presence of aluminum halides.

The organo-iron cations produced by the process of this invention may be represented by the formula $$[Ar_2Fe]^{+2}$$

wherein each Ar is an aromatic hydrocarbon group containing the benzenoid ring system. The benzenoid ring system is the six-carbon, unsaturated ring which may be represented by the structural formula:

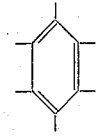

The simplest member of the class of organo-iron cations produced by the process of this invention is the bis(benzene) iron cation, $(C_6H_6)_2Fe^{+2}$.

These organo-iron cations are associated, both in solution and in the solid state, with a sufficient number of negatively charged ions to produce electrical neutrality. Examples of such anions are chloride, bromide, iodide, perchlorate, picrate, Reineckate, tetrachloroaluminate, heptabromodialuminate, and tetraphenylboron.

By the process of this invention, an iron tetracarbonyl dihalide is reacted with an aromatic hydrocarbon in the presence of an aluminum halide to form bis(aromatic hydrocarbon) iron cations such as the bis(mesitylene)iron ion. The reaction is preferably carried out in an excess of the aromatic hydrocarbon reactant at a temperature in the range of minus 20° C. to 100° C. Such reaction may be illustrated by the following equation showing the reaction of mesitylene with iron tetracarbonyl dibromide in the presence of aluminum bromide to form bis(mesitylene)iron ditetrabromoaluminate:

$$Fe(CO)_4Br_2 + 2(CH_3)_3C_6H_3 + 2AlBr_3 \rightarrow [(CH_3)_3C_6H_3]_2Fe(AlBr_4)_2 + 4CO$$

The iron tetracarbonyl dihalide is preferably iron tetracarbonyl dibromide because the dibromide may be conveniently prepared and because it reacts at a convenient temperatures of about minus 20° C. to 100° C. The iron tetracarbonyl dichloride may be used at a temperature below 10° C. and the iron tetracarbonyl di-iodide may be used at temperatures above 50° C. with satisfactory results.

The iron tetracarbonyl dihalides useful in the process of this invention may be prepared by the methods referred to in Moeller, T., "Inorganic Chemistry," John Wiley & Sons, Inc., New York, 1952, p. 714. An example of preparing iron tetracarbonyl dibromide is given hereinbelow.

The organic reactant in the process of this invention is at least one aromatic hydrocarbon containing the benzenoid ring system. Thus, examples of the aromatic hydrocarbon reactants are benzene; alkyl-substituted benzenes such as toluene, cumene, n-butyl benzene, mesitylene, xylene and hexamethylbenzene; aryl-substituted benzenes such as diphenyl, terphenyl and quaterphenyl; alkaryl-substituted benzenes such as tolyl benzene, mesityl benzene and the ditolyls; aralkyl-substituted benzenes such as diphenyl methane, diphenyl ethane, p,p'-diethyldiphenyl methane and diphenyl propane; and alkylene-substituted benzenes such as tetrahydronaphthalene.

Mixtures of these aromatic hydrocarbon compounds may also be employed to produce bis(aromatic hydrocarbon) iron cations containing two different organic groups.

The aluminum halide catalyst is preferably aluminum bromide because it is more easily removed from the reaction products. However, aluminum iodide, aluminum chloride and aluminum fluoride may also be used with satisfactory results. The aluminum halide catalyst must be substantially anhydrous.

Although it is preferable to carry out the reaction in an excess of the aromatic organic reactant, an inert organic hydrocarbon such as heptane or petroleum ether may be used as a solvent for the reaction.

The ratio of reactants is not critical. The aromatic organic reactant is generally used in stoichiometric excess both to act as a solvent for the reaction and in the interest of increasing the rate of reaction. The aluminum halide is generally used in amounts at least double the amount of the iron tetracarbonyl dihalide reactant, although smaller amounts are operable.

The reaction is carried out in the absence of air and moisture, preferably under an inert atmosphere such as argon, nitrogen or helium. In general, the reaction temperature may be varied over a considerable range of from minus 20° C. to 150° C., depending on the iron tetracarbonyl dihalide employed. Temperatures in excess of the decomposition temperature of the products are to be avoided.

The time for carrying out the reaction may be varied over wide limits. The reactants should be maintained under the desired reaction conditions after the evolution of carbon monoxide has essentially ceased for at least 15 minutes.

The bis(aromatic hydrocarbon) iron cations, as produced by the process of this invention, are associated with anions derived from the iron tetracarbonyl dihalide and aluminum halide reactants. In particular, these associated anions are primarily a mixture of tetrahaloaluminate ions, heptahalodialuminate ions, and relatively small amounts of halide ions. For example, the reaction of cumene, iron tetracarbonyl dichloride and aluminum chloride gives the bis(cumene) iron cation associated primarily with $AlCl_4^-$ and $Al_2Cl_7^-$ ions. Such salts of bis(aromatic hydrocarbon) iron cations with $AlX_4^-$ and $Al_2X_7^-$ ions, where X represents a halogen, will be designated hereinafter as bis-aromatic hydrocarbon) iron complex haloaluminates.

The bis(aromatic hydrocarbon) iron complex haloaluminates produced by the reaction of an aromatic hydrocarbon and the iron tetracarbonyl dihalide may be reacted with diethyl ether to produce bis(aromatic hydrocarbon) iron ditetrahaloaluminates which may then be reacted with tetrahydrofuran to produce bis(aromatic hydrocarbon) iron dihalides. Also, the dihalides may be produced from the complex haloaluminates by reaction with tetrahydrofuran.

These reactions take place because ethers tend to form stable addition complexes with certain metal halides, particularly aluminum halides. Such reactions may be represented by the following equations:

(a) 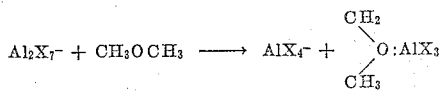

(b) 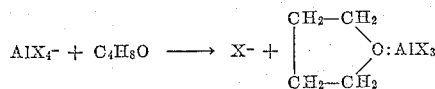

(c) 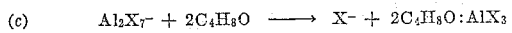

The aluminum halide-tetrahydrofuran complexes are relatively more stable than the aluminum halide-diethyl ether complexes. Therefore, tetrahydrofuran will react with the $AlX_4^-$ ion where diethyl ether will not.

The aluminum halide-ether complexes are slightly soluble in the ether. Therefore, the reaction of the ether with the haloaluminate ions may be conveniently carried out by placing the bis(aromatic hydrocarbon) iron haloaluminate salt in a filter paper or fritted glass filter and pouring successive portions of the ether over the salt until the reaction is substantially complete. Air and moisture should preferably be excluded during the reaction and this may be accomplished by maintaining an atmosphere of inert gas, such as nitrogen or argon.

Bis(aromatic hydrocarbon) iron salts containing a wide variety of anions may be prepared by metathetical reaction with appropriate reagents. For example bis(toluene) iron dibromide may be reacted with sodium tetraphenylboron to give bis(toluene) iron ditetraphenylboron.

The following examples illustrate the process of this invention.

*Example I*

Iron pentacarbonyl, 104.5 grams, dissolved in 400 milliliters of n-heptane, was placed on a one liter three-neck flask equipped with a condenser, stirrer, and dropping funnel. Anhydrous bromine (33.0 milliliters) dissolved in 300 milliliters of n-heptane, was added dropwise over a period of four hours. The reaction was carried out under an inert atmosphere of argon. The reaction vessel was cooled in a Dry Ice-acetone bath throughout the bromine addition. After all of the bromine had been added the reaction mixture was stirred and allowed to warm to room temperature.

The stirring was continued for an additional hour. The red, solid iron tetracarbonyl dibromide was filtered from the reaction mixture, washed with n-heptane and dried under reduced pressure. About 164 grams of $Fe(CO)_4Br_2$ was recovered. This represents a yield of 94% based on $Fe(CO)_5$.

*Example II*

Iron tetracarbonyl dibromide (0.1 mole, 32.8 grams) and 250 milliliters of mesitylene were placed in a 500 milliliter round bottom reaction vessel. The reaction was carried out under an inert atmosphere of argon. Aluminum bromide (88.8 grams) was then added slowly over a period of three hours through a solids-addition funnel at room temperature. Carbon monoxide was evolved throughout the addition. After carbon monoxide evolution had essentially ceased, the reaction mixture was heated to 50° C. for one hour. The reaction vessel was allowed to cool to room temperature and the contents removed in an inert atmosphere of argon. The crude orange-red product was then filtered from the excess mesitylene, washed with n-heptane to remove excess aluminum bromide and dried under a partial vacuum of 1 mm. Hg. After drying the solid product weighed 131.9 grams and was found to be a bis(mesitylene) iron bromoaluminate, having the following empirical formula: $C_{18}H_{24}FeAl_{2.67}Br_{10}$. This formula corresponds to a complex salt wherein three $(C_9H_{12})Fe^{+2}$ cations are associated with four $AlBr_4^-$ ions and two $Al_2Br_7^-$ ions. The yield of 131.9 grams is essentially quantitative based on $Fe(CO)_4Br_2$.

Analysis:

|   | Found, percent | Calculated for $C_{18}H_{24}FeAl_{2.67}Br_{10}$, percent |
|---|---|---|
| C | 19.4 | 18.5 |
| H | 2.2 | 2.1 |
| Fe | 4.6 | 4.8 |
| Br | 68.4 | 68.4 |
| Al | 6.2 | 6.7 |

*Example III*

A 5 gram portion of the product of Example II was washed with diethyl ether until the filtrate was colorless. A 3.75 gram yield of bis(mesitylene) iron ditetrabromoaluminate was recovered. This represents a quantitative yield of bis(mesitylene) iron ditetrabromoaluminate based on iron in the starting material and a loss of 1.25 grams of the aluminum bromide in the starting material by complex formation with the ether.

Analysis:

|   | Found, percent | Calculated for $(C_9H_{12})_2Fe(AlBr_4)_2$, percent |
|---|---|---|
| C | 21.8 | 21.8 |
| H | 2.5 | 2.4 |
| Fe | 6.0 | 5.7 |
| Br | 64.4 | 64.6 |
| Al | 5.2 | 5.5 |

*Example IV*

The product of Example III, 3.75 grams of $$(C_9H_{12})_2Fe(AlB_4)_2$$

was repeatedly washed with tetrahydrofuran to yield bis(mesitylene) iron dibromide.

Analysis:

|   | Found, percent | Calculated for $C_{18}H_{24}FeBr_2$, percent |
|---|---|---|
| C | 46.5 | 47.3 |
| H | 5.2 | 5.3 |
| Fe | 11.9 | 12.2 |
| Br | 35.5 | 35.2 |
| Al | 1.8 | |

Additional examples of the process of the present invention are: the reaction of diphenyl with $Fe(CO)_4Br_2$ and $AlBr_3$ to give bis(diphenyl) iron cations; the reaction of a mixture of toluene and tetrahydronaphthalene with $Fe(CO)_4Br_2$ and $AlBr_3$ to give a mixture of bis(toluene) iron, bis(tetrahydronaphthalene) iron and (toluene) (tetrahydronaphthalene)iron cations; the reaction of o-xylene with $Fe(CO)_4I_2$ and $AlI_3$ to give bis(o-xylene) iron cations; the reaction of mesityl benzene with $Fe(CO)_4Cl_2$ and $AlCl_3$ to give bis(mesityl benzene) iron cations; and the reaction of diphenylmethane with with $Fe(CO)_4Br_2$ and $AlBr_3$ to give bis(diphenylmethane) iron cations.

The compounds prepared by the process of this invention are useful in making photosensitive paper. Thus, a photosensitive paper was made by impregnating a piece of filter paper with a 5 wt. percent solution of bis(mesitylene) iron dibromide in methanol in the absence of light. The paper was then dried and covered with a photographic negative and exposed to light. The paper was then washed with water to remove the unreacted bis(mesitylene) iron dibromide and brown-black prints were obtained.

One specific use of these compounds is to produce photosensitive paper for the reproduction of printed material. A photosensitive paper of suitable dimensions may be prepared as set forth above and covered with a sheet of white paper on which has been printed the material one desires to reproduce. The papers are then exposed to light and the photosensitive paper washed with water to produce a negative of the original.

Photosensitive papers made with compounds prepared by the process of this invention are particularly advantageous because only water is necessary to develop the print following exposure, thus avoiding the use of chemical developers.

What is claimed is:

1. A process for the production of stable bis(aromatic hydrocarbon) iron complex haloaluminates which comprises reacting the following:
   (1) at least one aromatic hydrocarbon compound selected from the group consisting of benzene, lower alkyl-substituted benzenes, diphenyl, terphenyl, quaterphenyl, lower alkylphenyl-substituted benzenes, phenyl lower alkyl-substituted benzenes and lower alkylene-substituted benzenes with
   (2) an iron tetracarbonyl dihalide wherein said halide is at least one member selected from the group consisting of chlorine, bromine and iodine, and with
   (3) an aluminum halide wherein said halide is at least one member selected from the group consisting of fluorine, chlorine, bromine and iodine.

2. Process in accordance with claim 2 wherein said reaction is carried out in an inert hydrocarbon solvent.

3. A process for producing a stable bis(lower alkyl benzene) iron complex bromoaluminate which comprises reacting a hydrocarbon lower alkyl benzene with iron tetracarbonyl dibromide and aluminum bromide.

4. A process for the production of bis(aromatic hydrocarbon) iron complex haloaluminates which comprises reacting the following:
   (1) at least one aromatic hydrocarbon compound selected from the group consisting of benzene, lower alkyl-substituted benzenes, and diphenyl, with
   (2) an iron tetracarbonyl dihalide wherein said halide is at least one member selected from the group consisting of chlorine, bromine and iodine, and with
   (3) an aluminum halide wherein said halide is at least one member selected from the group consisting of fluorine, chlorine, bromine and iodine.

5. A process for producing bis(mesitylene) iron complex bromoaluminate which comprises reacting mesitylene with iron tetracarbonyl dibromide and aluminum bromide.

6. A process for producing bis(benzene) iron complex bromoaluminate which comprises reacting benzene with iron tetracarbonyl dibromide and aluminum bromide.

7. Process for producing stable bis(aromatic hydrocarbon) iron ditetrahaloaluminates, said aromatic hydrocarbon being at least one member selected from the group consisting of benzene, lower alkyl-substituted benzenes, diphenyl, terphenyl, quaterphenyl, lower alkylphenyl-substituted benzenes, phenyl lower alkyl-substituted benzenes and lower alkylene-substituted benzenes, and said halogen being at least one member selected from the group consisting of chlorine, bromine and iodine, which process comprises; reacting a stable bis(aromatic hydrocarbon) iron complex haloaluminate, wherein said aromatic hydrocarbon and said halogen are defined as set forth hereinabove with diethyl ether.

8. Process for producing stable bis(aromatic hydrocarbon) iron dihalides, said aromatic hydrocarbon being at least one member selected from the group consisting of benzene, lower alkyl-substituted benzenes, diphenyl, terphenyl, quaterphenyl, lower alkylphenyl-substituted benzenes, phenyl lower alkyl-substituted benzenes and lower alkylene-substituted benzenes, and said halogen being at least one member selected from the group consisting of chlorine, bromine and iodine, which process comprises; reacting a stable bis(aromatic hydrocarbon) iron ditetrahaloaluminate, wherein said aromatic hydrocarbon and said halogen are defined as set forth hereinabove with tetrahydrofuran.

9. Process for producing stable bis(aromatic hydrocarbon) iron dihalides, said aromatic hydrocarbon being at least one member selected from the group consisting of benzene, lower alkyl-substituted benzenes, diphenyl, terphenyl, quaterphenyl, lower alkylphenyl-substituted benzenes, phenyl lower alkyl-substituted benzenes and lower alkylene-substituted benzenes, and said halogen being at least one member selected from the group consisting of chlorine, bromine and iodine, which process comprises; reacting a stable bis(aromatic hydrocarbon) iron complex haloaluminate, wherein said aromatic hydrocarbon and said halogen are defined as set forth hereinabove with tetrahydrofuran.

10. Process for producing bis(mesitylene) iron ditetrabromoaluminate which comprises reacting a bis(mesitylene) iron complex bromoaluminate with diethyl ether.

11. Process for producing bis(mesitylene) iron dibromide which comprises reacting bis(mesitylene) iron ditetrabromoaluminate with tetrahydrofuran.

12. Process for producing bis(mesitylene) iron dibromide which comprises reacting a bis(mesitylene) iron complex bromoaluminate with tetrahydrofuran.

No references cited.